(12) United States Patent
Wilson et al.

(10) Patent No.: US 6,817,416 B2
(45) Date of Patent: Nov. 16, 2004

(54) FLOW CONTROL DEVICE

(75) Inventors: James Brian Wilson, North Somerset (GB); Christopher Richard King, Stroud (GB)

(73) Assignee: ABB Offshore Systems Limited, Bristol (GB)

(*) Notice: Subject to any disclaimer, the term of this patent is extended or adjusted under 35 U.S.C. 154(b) by 57 days.

(21) Appl. No.: 10/309,810

(22) Filed: Dec. 4, 2002

(65) Prior Publication Data

US 2003/0132001 A1 Jul. 17, 2003

Related U.S. Application Data

(63) Continuation-in-part of application No. 09/731,396, filed on Dec. 4, 2000, now Pat. No. 6,494,265.

(30) Foreign Application Priority Data

Aug. 17, 2000 (GB) .............................................. 0020350

(51) Int. Cl.$^7$ ............................................. E21B 34/14
(52) U.S. Cl. ..................... 166/332.1; 166/386; 251/344
(58) Field of Search .......................... 166/332.1, 334.1, 166/334.4, 386, 316; 251/343, 344

(56) References Cited

U.S. PATENT DOCUMENTS 3,071,193 A * 1/1963 Raulins .................... 166/332.4
4,429,747 A * 2/1984 Williamson, Jr. ............ 166/321
4,944,349 A * 7/1990 Von Gonten, Jr. .......... 166/304
5,316,084 A * 5/1994 Murray et al. ............ 166/332.4
6,112,815 A * 9/2000 Bøe et al. ................... 166/320
6,276,458 B1 * 8/2001 Malone et al. .............. 166/386
6,371,208 B1 * 4/2002 Norman et al. .......... 166/334.4
6,668,935 B1 * 12/2003 McLoughlin et al. ....... 166/375

FOREIGN PATENT DOCUMENTS

GB    1 485 909      9/1977
GB    2 385 889 A    2/2002

* cited by examiner

Primary Examiner—David Bagnell
Assistant Examiner—Daniel P Stephenson
(74) Attorney, Agent, or Firm—Kirschstein, et al.

(57) ABSTRACT

A flow control device comprises an outer sleeve having an outer sleeve wall and at least one aperture through the outer sleeve wall; a inner sleeve having an inner sleeve wall and at least one aperture through the inner sleeve wall; and means for providing relative sliding movement of the sleeves between "open" positions allowing variable flow of fluid through the apertures of the sleeves and a "closed" position, so that relative movement of the sleeves produces available amount of opening through which fluid can flows. The apertures are arranged so that the change in the coefficient of velocity (CV) of fluid flowing through the apertures caused by a change in the relative displacement of the sleeves is substantially proportional to said change in relative displacement.

10 Claims, 6 Drawing Sheets

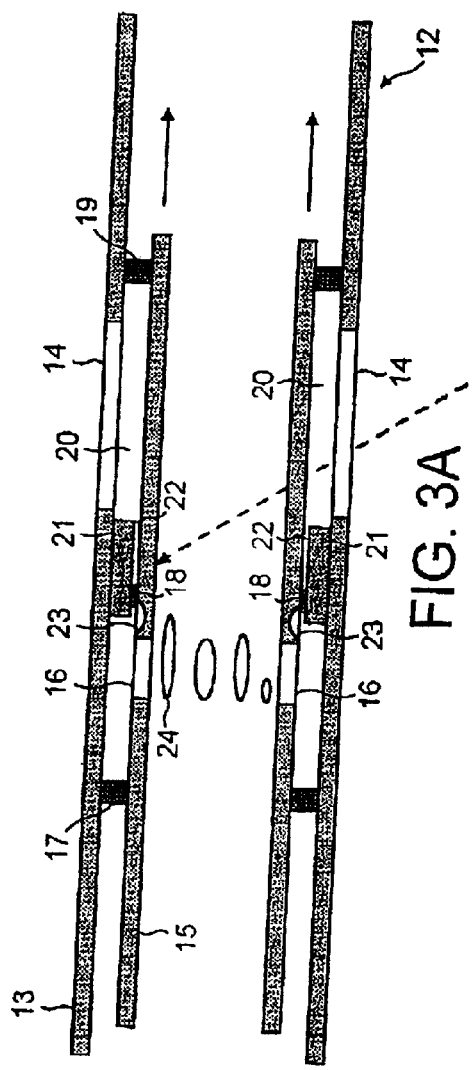
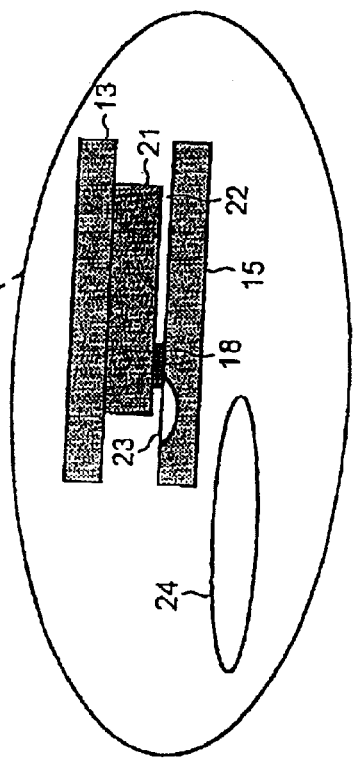
FIG. 3A
FIG. 3B

FLOW CONTROL DEVICE

This application is a continuation-in-part of application Ser. No. 09/731,396, filed on Dec. 4, 2000, now U.S. Pat. No. 6,494,265.

TECHNICAL FIELD

This invention relates to flow control devices, such as chokes for hydrocarbon wells,

BACKGROUND OF THE INVENTION

In a hydrocarbon well, chokes control flow of fluid into production tubing from the well bore or into regions of the well bore from the production tubing. Conventionally, such chokes have been simple on/off devices that merely fully opened or closed the production tubing. Recently, there has been a requirement for variable flow control which has given rise to particular problems. A conventional variable flow control choke is shown in the schematic drawing of FIG. 1a.

The basic features of this device are an outer sleeve 1 and an inner sleeve 2, each having respective sets 3, 4 of apertures located about their respective circumferences. The outer sleeve 1 may be an integral part of a section of production tubing. The inner sleeve 2 is slidably moveable by means of an actuator (not shown). FIG. 1a shows the location of the sleeves in a "closed" position. FIGS. 1b and 1c show the relative positions of the sleeves in two different "open" positions—partly open and fully open, respectively. The arrows of FIGS. 1b and 1c represent the flow of fluid from the well bore into the production tubing via the apertures 3, 4.

Annular seals 5, 6 and 7 are located between the inner and outer sleeves 2 and 1. These seals separate the annular gap between the inner and outer sleeves into chambers whilst allowing the inner sleeve to move freely. For example, there is an annular chamber 8 between seals 6 and 7, which chamber includes the apertures 3 of the outer sleeve 1.

Activation of the actuator causes the inner sleeve 2 to be moved in the direction of the arrows shown in FIG. 1a. FIG. 1b shows the apparatus of FIG. 1a in a partially open position, wherein the apertures 4 of the inner sleeve encroach on the chamber 8, thereby opening up a flow path. In the fully open position of FIG. 1c, the apertures 4 of the inner sleeve are located entirely within the chamber 8.

Various problems may be encountered with this conventional type of flow control device. For example, as the device begins to enter an "open" position, pressure on one side of the seal tends to distort the seal and extrude it in the direction of fluid flow Therefore, in an example shown in FIG. 1b, the seal 6 tends to be extruded into the apertures of the inner sleeve. Should the fluid flow be in the opposite direction (i e. from the production tubing to the well bore), the seal tends to extrude into the annular gap between the sleeves.

Another problem with this type of flow control device is that, at the point of opening, the fluid is flowing very quickly through the apertures, and at high pressure, with the result that the seal 6 can be damaged or dragged into the apertures 4 of the inner sleeve.

The high velocity of the fluid flow in the "just open" position of FIG. 1b can also cause another problem, namely that of erosion of the edges of the apertures, particularly when the fluid is contaminated with solid particles such as sand.

Yet another problem which may be encountered with conventional flow control devices is that the increase of fluid flow rate is not linear with linear movement of the tube and so accurate variable flow control is difficult, especially when low flow rates are required.

SUMMARY OF THE INVENTION

According to the invention there is provided a flow control device, comprising an outer sleeve having an outer sleeve wall and at least one aperture through the outer sleeve wall, an inner sleeve having an inner sleeve wall and at least one aperture through the inner sleeve wall and means for providing relative sliding movement of the sleeves between "open" positions allowing variable flow of fluid through the apertures of the sleeves and a "closed" position, so that relative movement of the sleeves produces a variable amount of opening through which fluid can flow, wherein the apertures are arranged so that the change in the coefficient of velocity (CV) of fluid flowing through the apertures caused by a change in the relative displacement of the sleeves is substantially proportional to said change in relative displacement.

One of the sleeves could have a plurality of apertures, the sum of the widths of those apertures at positions along that sleeve increasing substantially exponentially in the direction of fluid flow.

The width of at least one of the apertures could increase in the direction of fluid flow. In this case the width of at least one of the apertures could increase substantially exponentially in the direction of fluid flow.

At least one of the apertures of said one of the sleeves could have a different length from another of those apertures. In this case the plurality of apertures could be grouped in pairs, both apertures of each pair for example having the same length. In the latter case the apertures of each pair could be arranged diametrically opposite each other around the perimeter of said one of the sleeves.

The longest one of the apertures of said one of the sleeves could be narrower than the or each other of those remaining apertures.

The present invention also comprises production tubing including a flow control device according to the invention.

The present invention also comprises a hydrocarbon well including a flow control device according to the invention.

The invention will now be described by way of example, with reference to the accompanying drawings.

BRIEF DESCRIPTION OF THE DRAWINGS

FIG. 3a is a schematic cross sectional view of apparatus constructed according to the invention;

FIG. 3b is a more detailed view of part of the apparatus of FIG. 3a;

Like reference numerals apply to like parts throughout the specification.

DETAILED DESCRIPTION OF THE INVENTION

Figure 2:
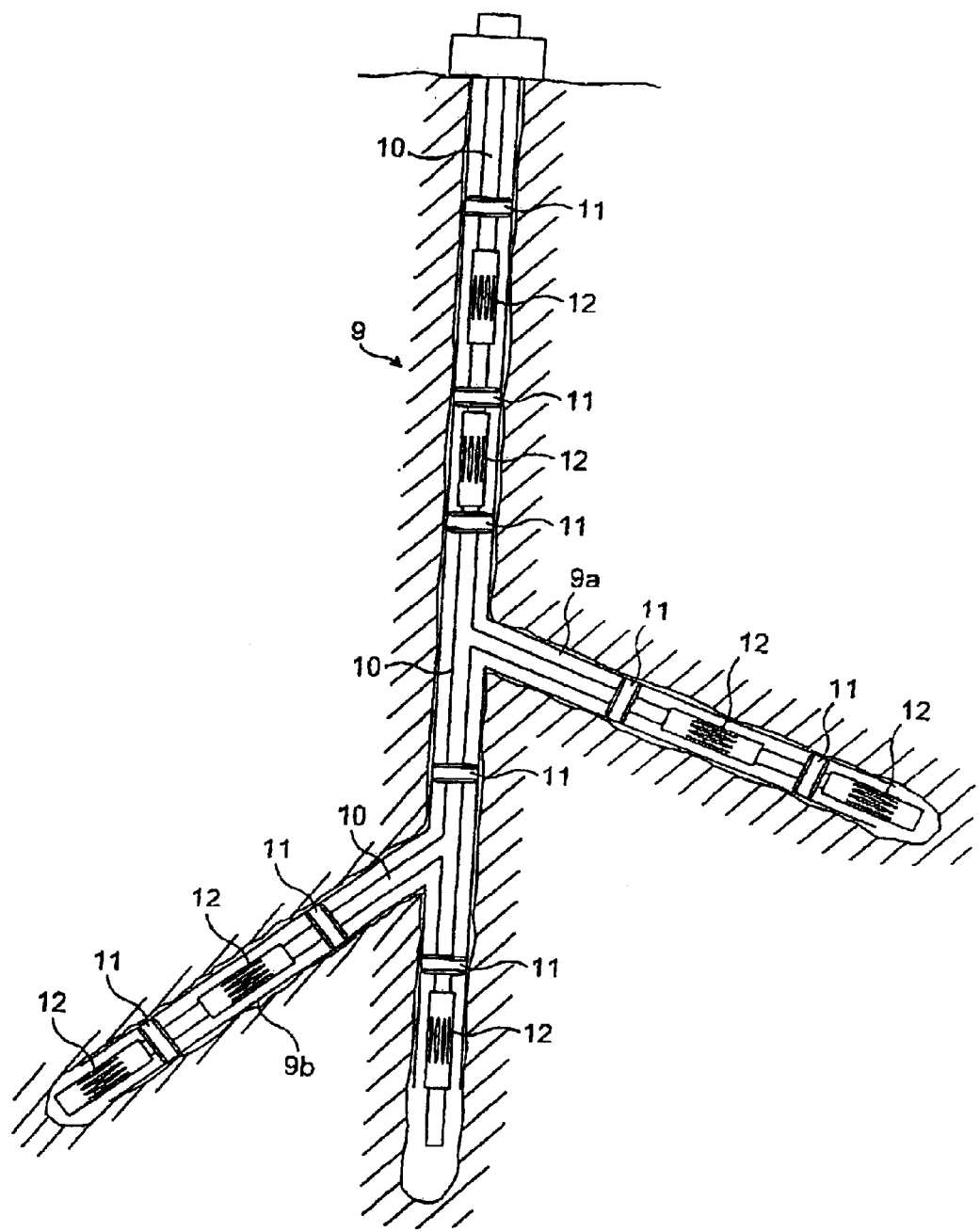
FIG. 2 is a schematic diagram showing an arrangement of flow control devices in a subsea well bore.

With reference to FIG. 2, there is shown a typical arrangement of a well bore, indicated generally by the reference numeral 9, with a number of branches 9a, 9b. Production tubing 10 extends from the mouth of the bore to oil reservoirs. The space between the tubing and the well bore is sealed at points along its length by means of devices 11 known as packers. Interposed between adjacent packers are chokes 12 which are operated by actuators (not shown). In use, oil or other hydrocarbon fluids enter the production tubing 10 through the apertures in the choke devices 12, if open. The selection and operation of the motors associated with the choke actuators is carried out by operator selection by means of a surface control display. Sensors (also not shown) may be employed to provide the operator with accurate information regarding the position and condition of the chokes 12.

Figure 1A:
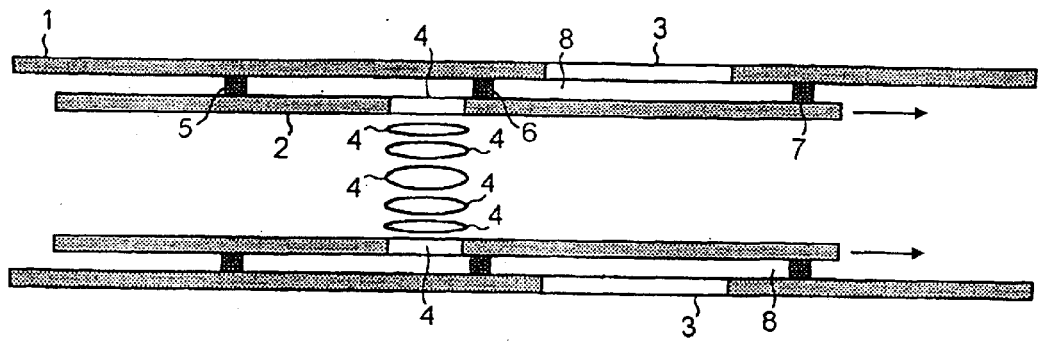
FIGS. 1a–1c are schematic cross sectional views of a conventional flow control device in closed and open positions.
Figure 1B:
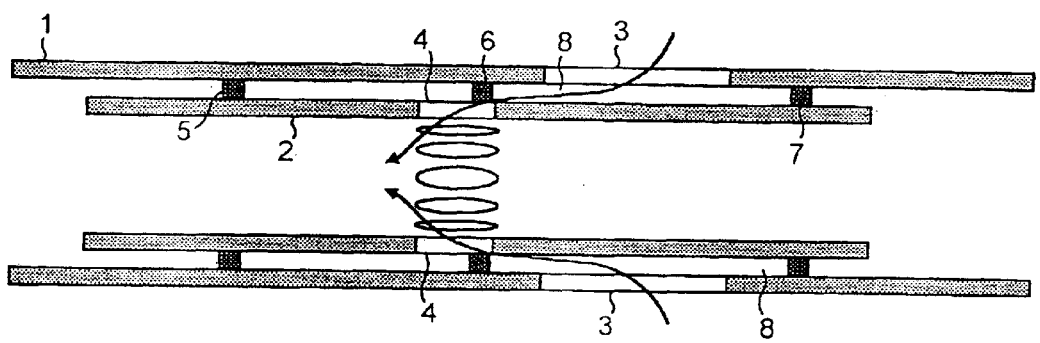
Figure 1C:
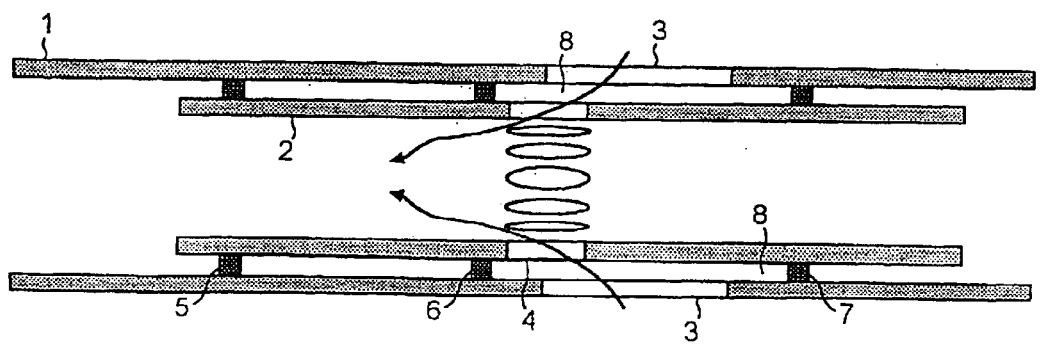
Figure 3C:
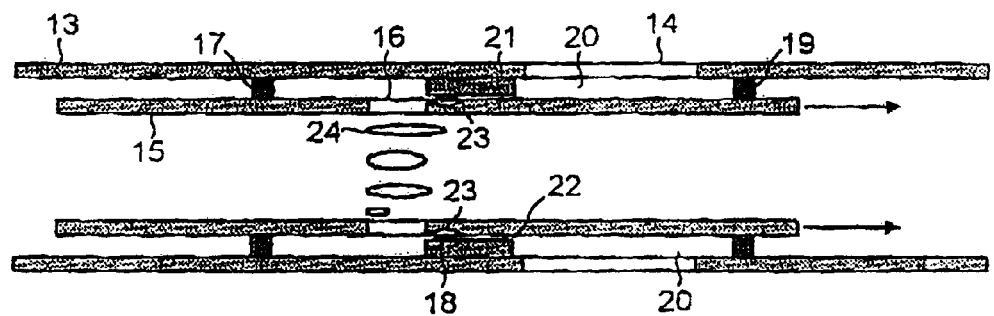
FIGS. 3c–3e illustrate the apparatus of FIG. 3a at various stages of opening.

FIG. 3a illustrates a choke 12, or flow control device, constructed according to the various aspects of the invention. This flow control device has the same basic features as that shown in FIGS. 1a–1c, namely an outer sleeve 13 having a set 14 of apertures, an inner sleeve 15 having a set of apertures 16, a sealing arrangement 17, 18, 19 and an actuator (Not shown) arranged to move the inner sleeve 15 relative to the outer sleeve 13. The arrangement of the seals 18 and 19 defines an annular chamber 20, between the sleeves, incorporating the set of apertures 14 of the outer sleeve. FIGS. 3a–3e illustrate the principles behind features of the flow control device and are not intended to accurately reflect the dimensions of an actual device. For example, it is unlikely that the annular seal 17 would be as close in proximity to the seal 18 as is shown in the drawings.

A pressure-reducing region in the form of an annular insert 21 is interposed between the seal 18 and the outer sleeve 13 The insert 21 forms a region of reduced size in the form of a narrow annular passage 22 in front of the seal 18. The annular insert 21 is shown in the more detailed drawing of FIG. 3b, as is one of a set of grooves 23 scored into the outer surface of the inner sleeve 15. The grooves 23 are located just before the apertures 16 of the inner sleeve 15 in the direction of opening movement. The function of both the annular insert 21 and the grooves 23 will be described later in this specification.

Another feature of the choke of FIG. 3a is that the apertures 16 of the inner sleeve 15 are of different shapes and sizes. At least one of the apertures 24 of this set 16 extends beyond the others in the direction of opening movement of the flow control device, which direction is shown by the arrows.

The lengths and shapes of the apertures 16 are selected so that the change in the coefficient of velocity (CV) of fluid flowing through them caused by a change in the relative displacement of the sleeves 13, 15 is proportional to the change in relative displacement, such that the ratio of CV to the effective length (ie the length of the aperture through which fluid can flow) is substantially constant for any effective length. In other words, the percentage change of CV is equal to the percentage change in displacement. The coefficient of velocity is a characteristic of the flow described by the following formula:

$$\text{Flow} = CV\sqrt{(\Delta P/SG)}$$

where flow is measured in litres/minute, $\Delta P$ is the pressure drop across the aperture in bar, SG is the specific gravity.

The desired relationship between CV and relative displacement may be obtained by making the sum of the widths of all the apertures 16 at a position along the inner sleeve 15 increase substantially exponentially along the sleeve in the direction of fluid flow. This is achieved by appropriate selection of the lengths of the individual apertures 16. All the apertures 16 are aligned in the axial direction at the downstream end of the apertures, ie the left-hand sides of the apertures in FIG. 3a are aligned. However, the apertures 16 extend for various different lengths in the upstream direction. Therefore as the inner sleeve 15 is displaced to increase the flow, the apertures 16 are gradually opened until the fully opened position is reached. Advantageously, the apertures 16 are arranged in pairs, the apertures of each pair being of the same length and the apertures of each pair being located at diametrically opposite points around the inner sleeve 15.

In a particular embodiment, inner sleeve 15 has a thickness of 0.327" and an outer diameter of 5.250". Ten apertures 16 are provided in the inner sleeve 15, grouped into five pairs. The longest pair of apertures 24 each have a length of 4" and width of 0.625". The other pairs have lengths of 31", 2.75", 2.15" and 1.5" respectively, and all have a width of 0.9".

Referring now to FIG. 3c, this shows commencement of an opening operation by the actuator, which is moving the inner sleeve 15 in the direction shown in the arrows. In this drawing the grooves 23 bridge the seal 18 and are now impinging on the chamber 20, which chamber includes the apertures 14 of the outer sleeve 13. Thus, hydrocarbon fluid entering the chamber 20 from the well is permitted to seep around the grooves, bypassing the seal 18, even though the choke 12 has not attained an "open" position This has the effect of balancing fluid pressure on both sides of the seal 18 prior to the flow control device entering an open position, thus reducing the problem of extrusion of the seal, which was hitherto caused by high pressure of the inflowing fluid acting on this seal.

Figure 3D:
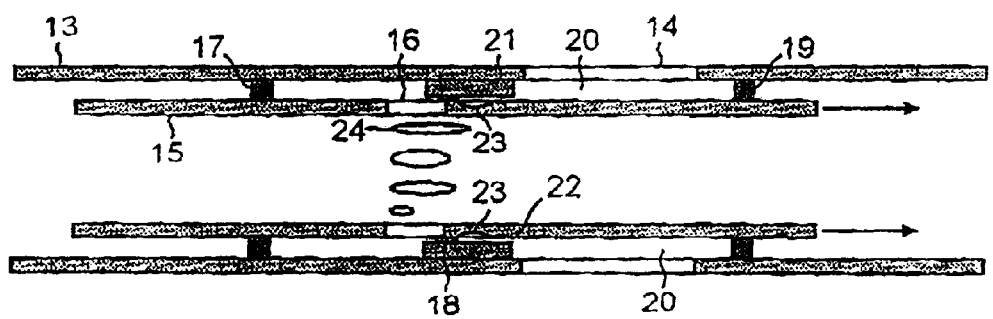

FIG. 3d shows the flow control device entering an open position. The longest aperture 24 of the inner sleeve 15 has just moved past the seal 18 and encroaches slightly on the chamber 20, thus permitting a small amount of fluid to flow into the bore of the inner sleeve 15. Thus, a low rate of fluid flow through the flow control device is achievable This was more difficult with the conventional chokes in which the apertures were of the same shape and size and were aligned; small changes in flow rate could only be achieved by minute deflections of the inner sleeve, which was very difficult owing to actuators being relatively crude positioning devices.

Prior to entering the aperture 24 of the inner sleeve 15, fluid entering the chamber 20 from the well is directed into the small annular passage 22 provided by the annular insert 21. The dimensions of the annular passage 22 are chosen so that a large proportion of the pressure of the inflowing fluid is dropped along the passage, that is to say there is a pressure differential between the ends of the passage. Therefore, fluid entering the inner sleeve 15 is at a lower pressure than was hitherto encountered with a conventional choke. This feature prevents the seal 18 being damaged or dragged into the apertures and also reduces erosion. The radial dimensions of the passage 22 need to be large enough, however, to prevent blockage from contaminants in the fluid.

Figure 3E:
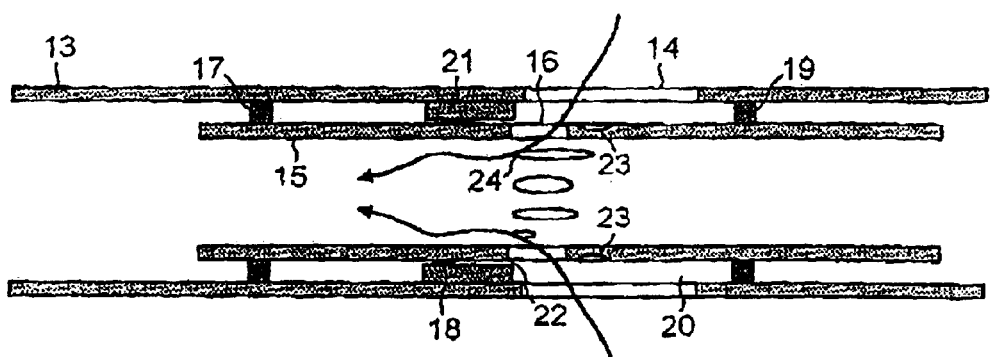

FIG. 3e shows the choke in the fully open position. In this position, fluid is able to flow through all of the apertures 16 in the inner sleeve 15, thereby producing maximum achievable flow into the production tubing. It should be noted that, as the actuator moves between the positions of FIGS. 3d and 3e, the effective length of the annular passage 22 reduces, so that the apertures 16 of the inner sleeve 15 are gradually exposed to increasing pressure, culminating in full exposure to the pressure of the inflowing fluid.

Figure 4:
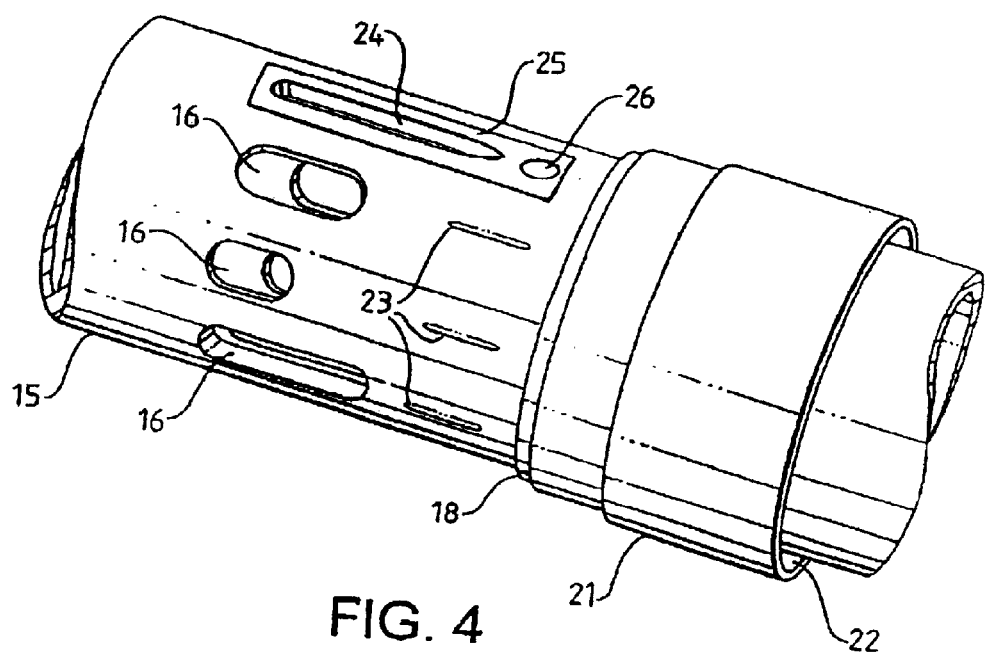
FIG. 4 is a perspective view of the apparatus of FIG. 3.

FIG. 4 shows an example of the layout of the inner sleeve 15 more clearly. For illustrative purposes, the seal 18 is shown attached to the inner sleeve 15, as is the annular insert 21. The grooves 23 are also shown, positioned in front of all of the apertures 16 in the inner sleeve 15, except for the longest aperture 24. A further feature of this apparatus is that the aperture 24 includes an erosion-resistant insert 25, typically made of tungsten. The insert 25 is secured to the inner sleeve 15 by a screw fastener 26 at one end portion and has a lip-shaped contour at the other end portion, which engages in the aperture 24. The insert 25 is tapered around the edges of the aperture 24, thereby providing an effective tapering of the aperture, to further resist erosion. Of course, the apertures themselves could be tapered as an extra safeguard against erosion.

Figure 5:
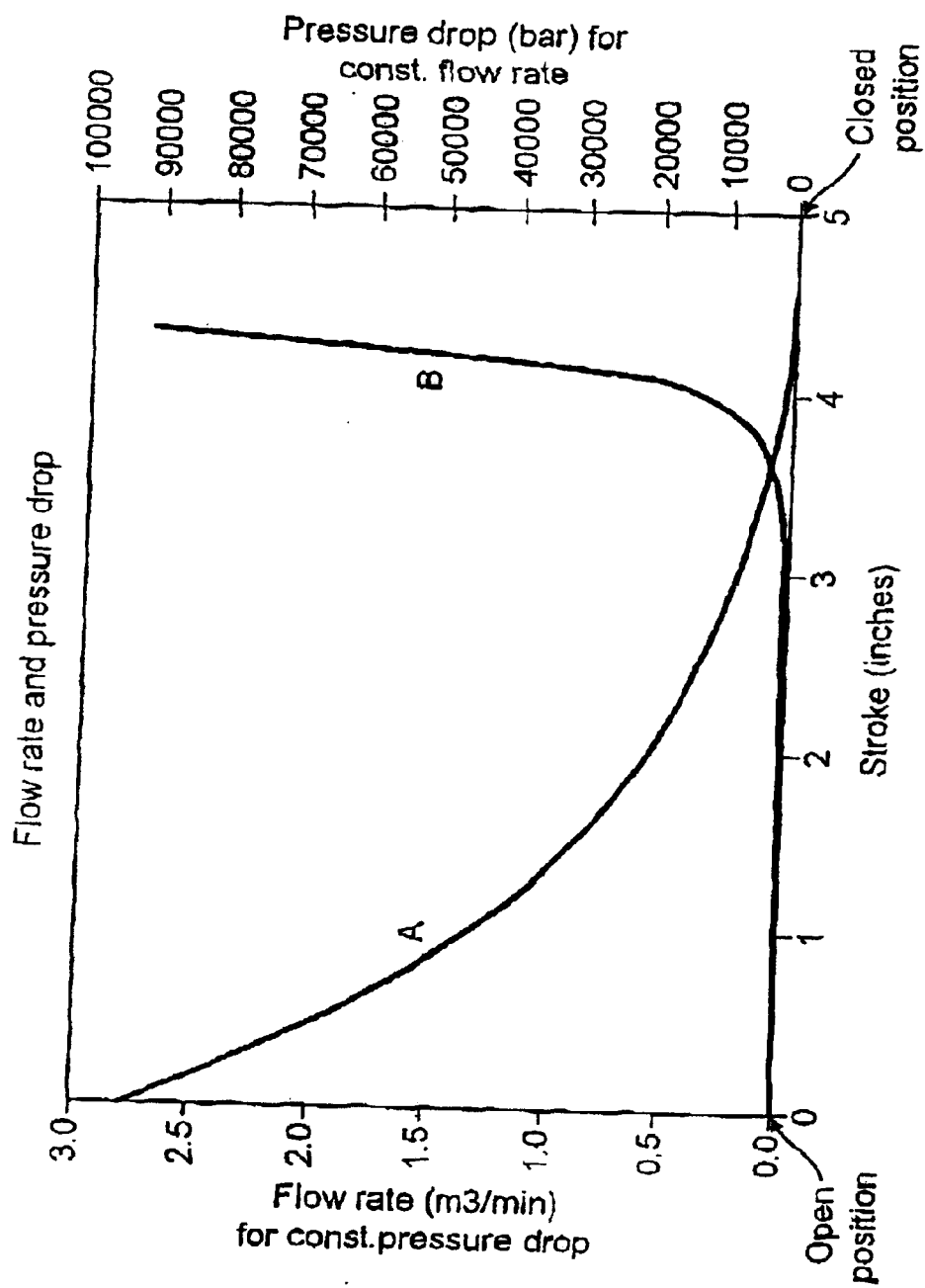
FIG. 5 illustrates graphically the change in flow rate and pressure drop available with the apparatus of FIG. 3.

The curve labelled A on FIG. 5 illustrates the change in flow rate achievable with a device of the invention. The flow rate is plotted against the stroke of the inner sleeve, as moved by the actuator. This change in flow rate with stroke exhibits more linear characteristics than was hitherto achievable. Furthermore, very low flow rates are achievable. Previously, there was a step between zero flow rate in the closed position and the flow rate in the "just open" position. The corresponding graph of the pressure change across the apertures is also shown in the curve labelled B.

The invention is particularly suited to the control of chokes downhole in hydrocarbon wells, however it is eminently suitable for controlling the flow of fluid in general in other applications.

In a hydrocarbon well, usually only the inner sleeve is moved to control flow changes. In other applications, it may be more advantageous for the outer sleeve, or even both sleeves, to be moved by actuator mechanisms. A suitable actuator mechanism is that described in UK Patent Specification No. 2 350 659.

The invention has been described with respect to fluid flowing from a well bore into production tubing, i.e. from the exterior of the outer sleeve to the interior of the inner sleeve. However, the invention is equally suited to controlling fluid flow m the opposite sense, with either minima or no further adaptation needing to be made. Further variations may be made without departing from the scope of the invention. For example, the annular insert need not be interposed between the seal 18 and the outer sleeve. The insert could be attached to the outer sleeve in front of the seal or else attached to the inner sleeve. The insert could even be formed with the seal as an integral part.

As a further variation, the erosion-resistant insert could be attached to the inner sleeve by, for example, chemical bonding or could even be an integral part of the sleeve. All of the apertures of the inner and/or outer sleeves could be made erosion-resistant in this manner.

As described above, in order to ensure that the change in the coefficient of velocity CV is proportional to the relative displacement of the sleeves, the combined widths of all the apertures increases substantial exponentially in the direction of fluid flow, by using apertures of different lengths. Alternatively the apertures may each have the same length, with their individual widths increasing substantially exponentially in the downstream direction.

What is claimed is:

1. A flow control device, comprising:
    a) an outer sleeve having an outer sleeve wall and at least one aperture through the outer sleeve wall;
    b) an inner sleeve having an inner sleeve wall and at least one aperture through the inner sleeve wall; and
    c) means for providing relative sliding movement of the sleeves between open positions allowing variable flow of fluid through the apertures of the sleeves and a closed position, so that relative movement of the sleeves produces a variable amount of opening through which the fluid can flow; wherein
    d) one of the sleeves has a plurality of apertures, and a sum of widths of those apertures at positions along said one of the sleeves increases substantially exponentially in a direction of fluid flow; wherein
    e) the apertures are arranged so that a change in a coefficient of velocity (CV) of the fluid flowing through the apertures caused by a change in the relative movement of the sleeves is substantially proportional to the change in relative movement.

2. The device as claimed in claim 1, in which the width of at least one of the apertures increases in the direction of the fluid flow.

3. The device as claimed in claim 2, in which the width of at least one of the apertures increases substantially exponentially in the direction of the fluid flow.

4. The device as claimed in claim 1, in which at least one of the apertures of said one of the sleeves has a different length from another of those apertures.

5. The device as claimed in claim 4, in which the plurality of apertures is grouped in pairs.

6. The device as claimed in claim 5, in which both apertures of each pair have the same length.

7. The device as claimed in claim 6, in which the apertures of each pair are arranged diametrically opposite each other around a perimeter of said one of the sleeves.

8. The device as claimed in claim 4, in which the longest one of the apertures of said one of the sleeves is narrower than the remaining apertures.

9. Production tubing including a flow control device having:
    a) an outer sleeve having an outer sleeve wall and at least one aperture through the outer sleeve wall;
    b) an inner sleeve having an inner sleeve wall and at least one aperture through the inner sleeve wall; and
    c) means for providing relative sliding movement of the sleeves between open positions allowing variable flow of fluid through the apertures of the sleeves and a closed position, so that relative movement of the sleeves produces a variable amount of opening through which the fluid can flow; wherein
    d) one of the sleeves has a plurality of apertures, and a sum of widths of those apertures at positions along said one of the sleeves increases substantially exponentially in a direction of fluid flow; wherein
    e) the apertures are arranged so that a change in a coefficient of velocity (CV) of the fluid flowing through the apertures caused by a change in the relative movement of the sleeves is substantially proportional to the change in relative movement.

10. A hydrocarbon well including a flow control device having:
    a) an outer sleeve having an outer sleeve wall and at least one aperture through the outer sleeve wall;
    b) an inner sleeve having an inner sleeve wall and at least one aperture through the inner sleeve wall; and
    c) means for providing relative sliding movement of the sleeves between open positions allowing variable flow of fluid through the apertures of the sleeves and a closed position, so that relative movement of the sleeves produces a variable amount of opening through which the fluid can flow; wherein
    d) one of the sleeves has a plurality of apertures, and a sum of widths of those apertures at positions along said one of the sleeves increases substantially exponentially in a direction of fluid flow; wherein
    e) the apertures are arranged so that a change in a coefficient of velocity (CV) of the fluid flowing through the apertures caused by a change in the relative movement of the sleeves is substantially proportional to the change in relative movement.

* * * * *